United States Patent
Worth et al.

(10) Patent No.: US 10,471,783 B2
(45) Date of Patent: Nov. 12, 2019

(54) REGULATOR AND METHOD OF REGULATING THE PRESSURE LEVEL OF A MOTOR VEHICLE TIRE

(71) Applicant: Tommy A. Worth, Catoosa, OK (US)

(72) Inventors: Tommy A. Worth, Catoosa, OK (US); Michael Henry, Broken Arrow, OK (US)

(*) Notice: Subject to any disclaimer, the term of this patent is extended or adjusted under 35 U.S.C. 154(b) by 220 days.

(21) Appl. No.: 15/626,408

(22) Filed: Jun. 19, 2017

(65) Prior Publication Data

US 2018/0339560 A1 Nov. 29, 2018

Related U.S. Application Data

(63) Continuation-in-part of application No. 15/374,770, filed on Dec. 9, 2016, now abandoned.

(51) Int. Cl.
*B60C 23/00* (2006.01)
*B60C 23/10* (2006.01)

(52) U.S. Cl.
CPC ............ *B60C 23/003* (2013.01); *B60C 23/10* (2013.01)

(58) Field of Classification Search
CPC ............................... B60C 23/003; B60C 23/10
See application file for complete search history.

(56) References Cited

U.S. PATENT DOCUMENTS

| | | |
|---|---|---|
| 3,361,180 A | 1/1968 | Neilson et al. |
| 3,537,663 A | 11/1970 | Johnson |
| 3,961,309 A | 6/1976 | Eddy |
| 4,742,854 A | 5/1988 | Forslund |
| 4,763,709 A | 8/1988 | Scholer |
| 5,257,642 A | 11/1993 | Worth |
| 5,587,698 A | 12/1996 | Genna |
| 5,832,951 A | 11/1998 | Conroy, Sr. |
| 5,928,444 A | 7/1999 | Loewe et al. |
| 5,954,084 A | 9/1999 | Conroy, Sr. |
| 6,161,565 A | 12/2000 | Conroy, Sr. |
| 6,894,607 B1 | 5/2005 | Claussen et al. |
| 7,690,411 B2 | 4/2010 | Wilson |
| 7,909,076 B2 | 3/2011 | Wilson |
| 9,566,833 B2 | 2/2017 | Swindell |
| 2001/0015224 A1* | 8/2001 | Freigang ............... B60C 23/003 137/224 |
| 2003/0048178 A1* | 3/2003 | Bonardi ............. B60C 23/0416 340/442 |

(Continued)

*Primary Examiner* — Kip T Kotter
(74) *Attorney, Agent, or Firm* — Frank J. Catalano; Gable Gotwals, P.C.

(57) ABSTRACT

A vehicle-tire pressure-level regulator has a pressure vent cooperable with an actuator for pressure release and a pump for pressure recovery. The actuator and the pump motor are respectively electronically controlled to adjust the tire pressure in relation to high and low thresholds above and below a desired operating pressure throughout a race. The pressure vent does not operate if an accelerometer detects that the tire is distorted because the vehicle is turning. If the vehicle is not turning and the high pressure threshold is reached, the vent is opened. If the low pressure threshold is reached the pump is activated until the tire is restored to the desired operating pressure. Operation of the vent may be controlled to provide different rates of outlet flow as real-time pressure may require. Operation of the vent may be prevented if a transient pressure spike occurs.

13 Claims, 8 Drawing Sheets

(56) References Cited

U.S. PATENT DOCUMENTS

| | | |
|---|---|---|
| 2014/0012466 A1 | 1/2014 | Tanno |
| 2014/0090463 A1 | 4/2014 | Nagora et al. |
| 2015/0136270 A1 | 5/2015 | Keane |
| 2015/0314655 A1 | 11/2015 | Swindell |
| 2015/0375577 A1 | 12/2015 | Serbu et al. |

* cited by examiner

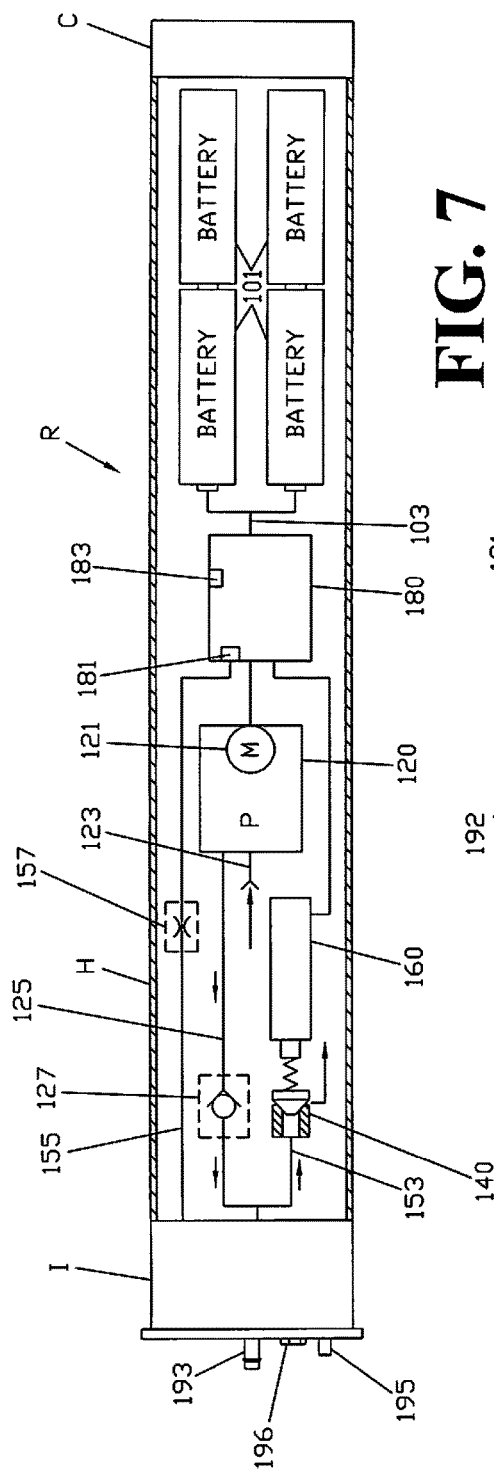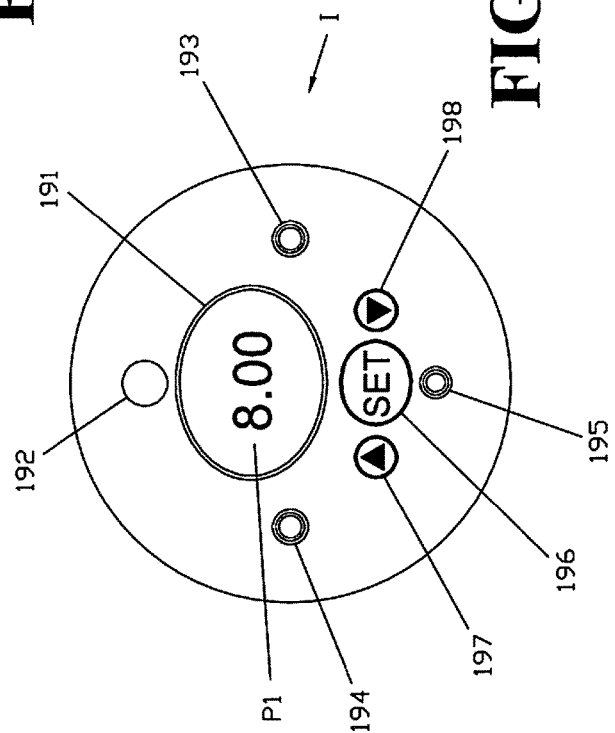

REGULATOR AND METHOD OF REGULATING THE PRESSURE LEVEL OF A MOTOR VEHICLE TIRE

CROSS-REFERENCE TO RELATED APPLICATIONS

This application is a continuation-in-part application claiming priority to U.S. patent application Ser. No. 15/374,770, filed Dec. 9, 2016.

BACKGROUND OF THE INVENTION

This invention relates generally to pressure control systems and more particularly concerns pressure regulators for tires.

Early tire pressure regulators facilitated automatic release of air from a tire if the tire pressure exceeds a predetermined maximum pressure of the tire. However, during the course of a race, as speeds and conditions change, tire pressures might fall below minimum desired tire pressures.

More recently, tire pressure regulators have been proposed which might facilitate automatic injection of air into a tire if the tire pressure falls below a predetermined minimum pressure. However, the proposed pressure regulators would accomplish air injection by use of compressed air cylinders. It is unlikely that the sanctioning bodies of any auto racing commissions will permit the presence of compressed air or gas cylinders anywhere on or in a race car. Furthermore, the counterbalancing of air tire pressure against the compressed air cylinder pressure results in inconsistencies in the speeds of injection and, as pressure equalization is approached when counterbalancing is complete, determination of all air injection to the tire will cease.

It is, therefore, an object of this invention to provide a tire pressure regulator which facilitates automatic release and injection of air out of and into a tire. Another object of this invention is to provide a tire pressure regulator which does not use compressed air cylinders as a pressure source. It is also an object of this invention to provide a tire pressure regulator which rapidly releases and injects air from and into a tire. A further object of this invention is to provide a tire pressure regulator capable of increasing tire pressure at a predictable and constant rate. And it is an object of this invention to provide a tire pressure regulator with the capacity to inject air into the tire throughout the duration of the race.

During the course of an auto race, tire pressure is constantly fluctuating, sometimes to extremes. Track speeds vary greatly between warm-ups and racing, between straightaways and curves, and between warning flags. Changes in tire revolutions-per-minute, in climatic and internal tire temperatures and in tire distortion associated with turns, acceleration and braking all contribute to changes in tire pressure.

The problems of coping with these tire pressure related issues throughout the changing conditions in the course of a race are further complicated because, at any given moment during the course of a race, each tire may be experiencing different forces depending on its location on the car. Outside tires are distorted by greater centrifugal forces than inside tires. Front tires run parallel on variable axes relative to the direction of the car while rear tires always run aligned on constant parallel axes. And any one tire might, at any time in a race, unexpectedly strike a feature on the track or an object not part of the track, causing a momentarily high spike in tire pressure.

Tires wear differently at different pressures and, in distance races, the time at which tire maintenance is required will be determined by the first of the tires in need. While wear is generally not an issue in sprint racing, sprint cars have continuous rear axles with no differential and the left rear tire has a smaller diameter than the right rear tire so that, in straightaways, one or both tires are skidding, a major cause of rapid heating.

At any distance, changes in tire pressure can change the response of the tire to the track. If the tires on a competing race-car can be kept within acceptable pressure levels throughout a race, the performance of both car and driver can be improved. And, depending on the length of the race, pressure control alone might sufficiently impact tire performance as to eliminate a time-consuming pit stop.

It is, therefore, an object of this invention to provide a vehicle-tire pressure-level regulator and method of regulation suitable for race-car competition. It is also an object of this invention to provide a vehicle-tire pressure-level regulator and method of regulation that closely tracks real-time tire pressure changes. It is a further object of this invention to provide a vehicle-tire pressure-level regulator and method of regulation that permits user selection of low and high threshold tire pressures. It is another object of this invention to provide a vehicle-tire pressure-level regulator and method of regulation that facilitates rapid correction to changes in tire pressure. It is yet another object of this invention to provide a vehicle-tire pressure-level regulator and method of regulation that takes into account transient spikes in tire pressure. It is also an object of this invention to provide a vehicle-tire pressure-level regulator and method of regulation that takes into account changes in tire pressure caused by tire distortion during vehicle turns. It is still another object of this invention to provide a vehicle-tire pressure-level regulator and method of regulation that is practical for independent use of a different regulator on each tire of the vehicle. A further object of this invention is to provide a vehicle-tire pressure-level regulator and method of regulation that minimizes depletion of available battery power for regulator operation. A corollary object of the invention is to provide a vehicle-tire pressure-level regulator and method of regulation having sufficient battery power to operate throughout a race. And it is an object of this invention to provide a vehicle-tire pressure-level regulator and method of regulation permitting rapid replacement of the regulator.

SUMMARY OF THE INVENTION

In accordance with the invention, a vehicle-tire pressure-level regulator has a normally-deactivated pump with an inlet from air surrounding the tire and an outlet into the tire. A controller causes activation of the normally-deactivated pump when a real-time pressure level of the tire is less than a predetermined threshold pressure. A sensor provides a real-time control signal representative of the real-time pressure level of the tire. The controller provides a "low pressure" control signal when the threshold signal exceeds the real-time control signal.

The regulator may also include a normally-closed pressure vent from the tire. The controller causes the normally-closed pressure vent to be opened when the real-time pressure level of the tire is greater than a predetermined threshold pressure. The sensor provides the real-time control signal representative of the real-time pressure level of the tire. The controller provides a "high pressure" control signal when the real-time control signal exceeds the threshold signal.

In another embodiment of the invention, a vehicle-tire pressure-level regulator and method of regulation are provided in which the regulator has a normally-closed pressure vent disposed in a discrete pneumatic path between the tire and atmospheric air in conjunction with an accelerometer that detects the status of vehicle-turning forces on the tire. The controller is adapted to cause the pressure vent to remain closed during periods of time in which the accelerometer detects the status of the vehicle as being that the tire is experiencing vehicle-turning forces. The regulator also includes a normally-deactivated pump disposed in a discrete pneumatic path between the tire and atmospheric air. Preferably, a check valve prevents leakage of the pump.

A sensor detects the real-time pressure level of the tire for comparison with high and low threshold pressure levels of the tire. The controller is also adapted, for periods of time in which the accelerometer does not detect a presence of vehicle turning forces on the tire, to cause the pressure vent to be open when the detected real-time pressure level of the tire is higher than the high threshold pressure level of the tire. Regardless of the presence of vehicle turning forces on the tire, the controller is also adapted to cause activation of the normally-deactivated pump when the real-time pressure level of the tire is lower than the low threshold pressure level of the tire. The controller may also be adapted to cause the pressure vent to be more open when the detected real-time pressure level of the tire is higher than a higher threshold pressure level of the tire than the high threshold pressure level.

The normally-closed pressure vent may be a single-position valve providing one predetermined rate of outlet flow or a two-position valve providing a first predetermined rate of outlet flow in the first valve position and a second predetermined rate of outlet flow greater than the first in the second valve position.

The two-position valve may be a normally-closed throttle valve with a tapered seat and poppet. A linear actuator has a compression spring biasing the poppet to full extension from the actuator. The bias is selected to permit the spring to be overcome when an absolute maximum pressure of the regulator is exceeded so that the valve will crack open to release the pressure. The linear actuator is operable to switch the valve to the first of the two positions at the high threshold pressure level and to the second of the two positions at the higher threshold pressure level.

The compression spring of the throttle valve may be preloaded to provide a selected stroke tolerance facilitating full insertion of the poppet into the seat. To this end, the poppet can be provided with a cavity. The linear actuator has a body with is a ram adapted for axial reciprocation in relation to the body. A pin extends axially from the rain to the head of the pin. A sleeve engaged on the poppet guides the pin to reciprocate the head of the pin in a cavity in the poppet. The coil spring is compressed between the sleeve and the ram. The depth of the cavity is sufficient to permit the ram to drive the head of the pin in the cavity within the range of the selected stroke tolerance.

The throttle valve and the actuator can be adapted to vary the rate of pressure release from the tire to the atmosphere. The controller receives a first signal representative of the detected real-time pressure level of the tire, a second signal representative of the high threshold pressure level of the tire and a third signal representative of the lack of presence of vehicle-turning forces on the tire. In two-position valve applications, the controller also receives a fourth signal representative of the higher threshold pressure level of the tire. The controller produces control signals selecting positions of the actuator in response to the received signals.

In some applications, the regulator may combine the normally-closed pressure vent, the accelerometer, the real-time pressure sensor, the signal representative of the high threshold pressure level of the tire and the controller with a mechanism adapted to cause the normally-closed pressure vent to remain closed upon the occurrence of a positive pressure spike above the high threshold pressure level of the tire for less than a predetermined duration. The mechanism may be an orifice disposed in a pneumatically discrete flow path between the tire and the sensor or may be the controller further adapted to ignore pressure changes existing for less than said predetermined duration.

According to the method of regulating the pressure-level of the vehicle tire, the status of vehicle-turning forces on the tire is determined and the normally-closed pressure vent of the tire is maintained in its closed condition during the detected presence of vehicle-turning forces on the tire. The real-time pressure level of the tire is detected. A high threshold pressure level of the tire is selected. During a simultaneous occurrence of both a detected real-time pressure level of the tire being higher than the selected high threshold pressure level of the tire and a lack of a detected presence of vehicle-turning forces on the tire, the normally-closed pressure vent of the tire is opened to provide a predetermined rate of outlet flow.

In some applications, a higher threshold pressure level of the tire than the high threshold pressure level of the tire is also selected. During a simultaneous occurrence of both a detected real-ti pressure level of the tire being higher than the selected higher threshold pressure level of the tire and a lack of a detected presence of vehicle-turning forces on the tire, the normally-closed pressure vent of the tire is opened to provide a higher predetermined rate of outlet flow than the predetermined rate of outlet flow.

Further according to the method of regulating the pressure-level of the vehicle tire, a low threshold pressure level of the tire is selected. During occurrence of the detected real-time pressure level of the tire being less than the selected low threshold pressure level of the tire, the normally-deactivated pump is activated.

In some applications, a real-time pressure level of the tire is detected and a high threshold pressure level of the tire selected. During the occurrence of a positive pressure spike at a level greater than the selected high threshold pressure level of the tire for less than a predetermined duration of time, the normally-closed pressure vent of the tire is maintained in a closed condition.

Also, the status of vehicle-turning forces on the tire can be detected. During a detected presence of vehicle-turning forces on the tire, the normally-closed pressure vent of the tire is maintained in its closed condition. During a simultaneous occurrence of both the detected real-time pressure level of the tire being higher than the selected high threshold pressure level of the tire and the lack of a detected presence of vehicle-turning forces on the tire, the normally-closed pressure vent of the tire is opened.

BRIEF DESCRIPTION OF THE DRAWING

Other objects and advantages of the invention will become apparent upon reading the following detailed description and upon reference to the drawings in which:

FIG. 7 is a diametric cross-sectional view of a housing containing a typical arrangement in block form of the pneumatic and electrical components of the vehicle-tire pressure-level regulator of FIG. 6;

FIG. 8 is an end view of the housing of FIG. 7 illustrating the pneumatic and electrical interface of the vehicle-tire pressure-level regulator components;

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Figure 1:
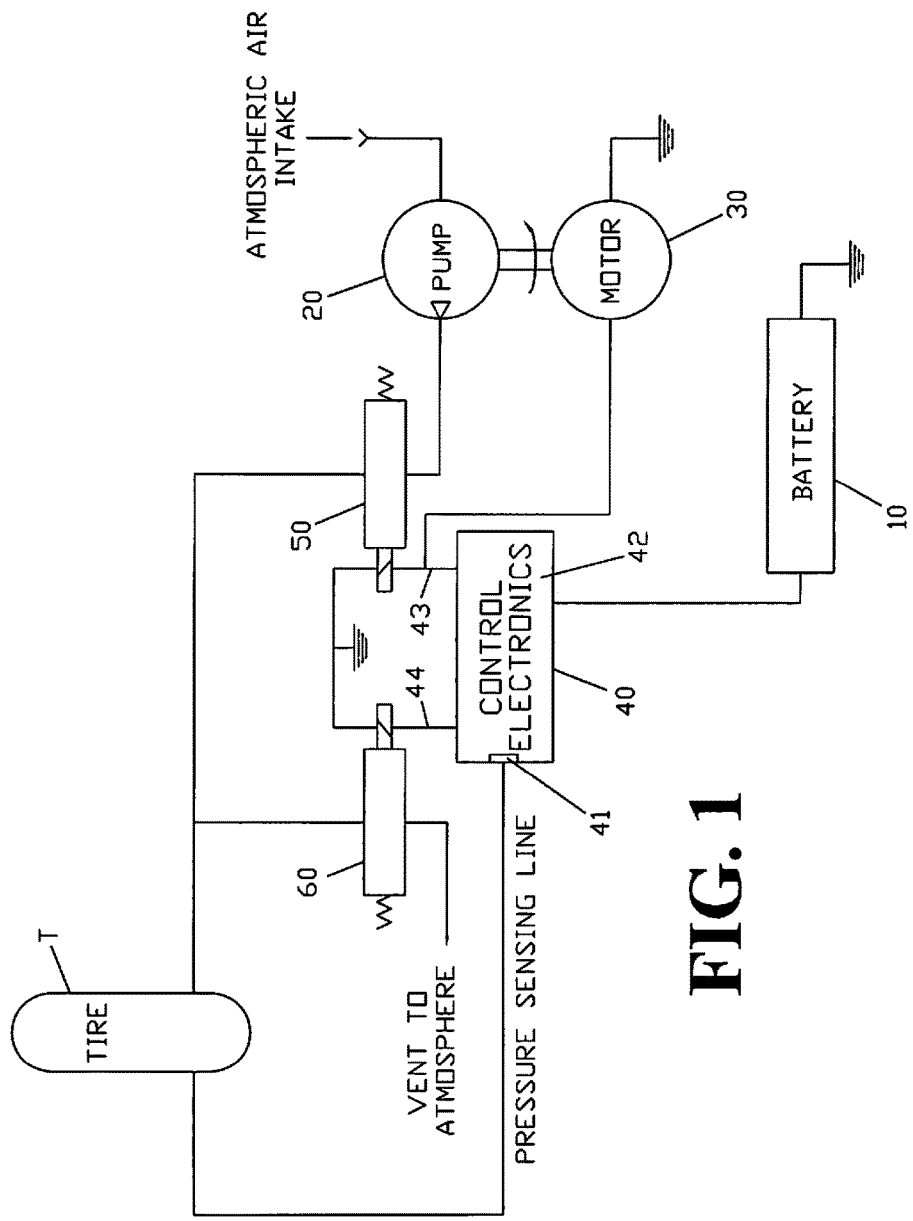
FIG. 1 is an electromechanical block diagram of a preferred embodiment of is a tire pressure regulator in accordance with the invention.
Figure 2:
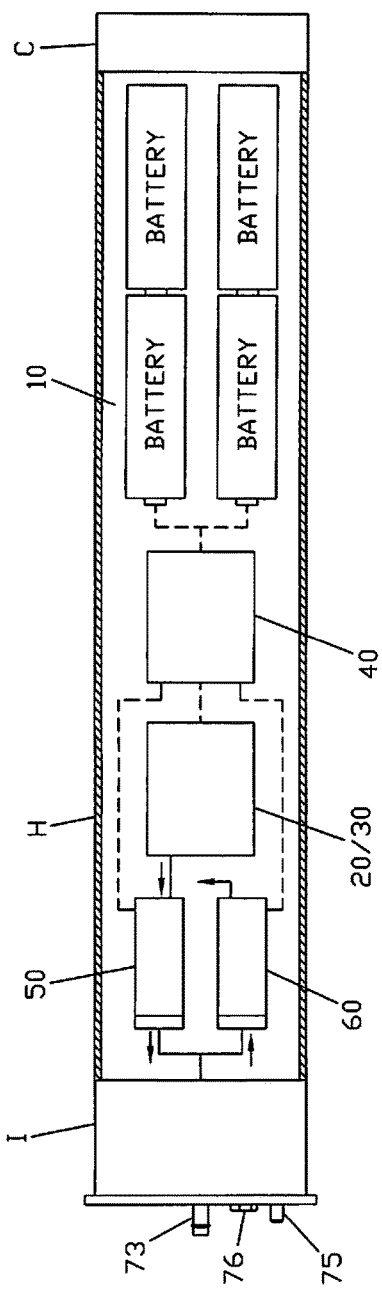
FIG. 2 is a diametric cross-sectional view of the pressure regulator of FIG. 1.
Figure 3:
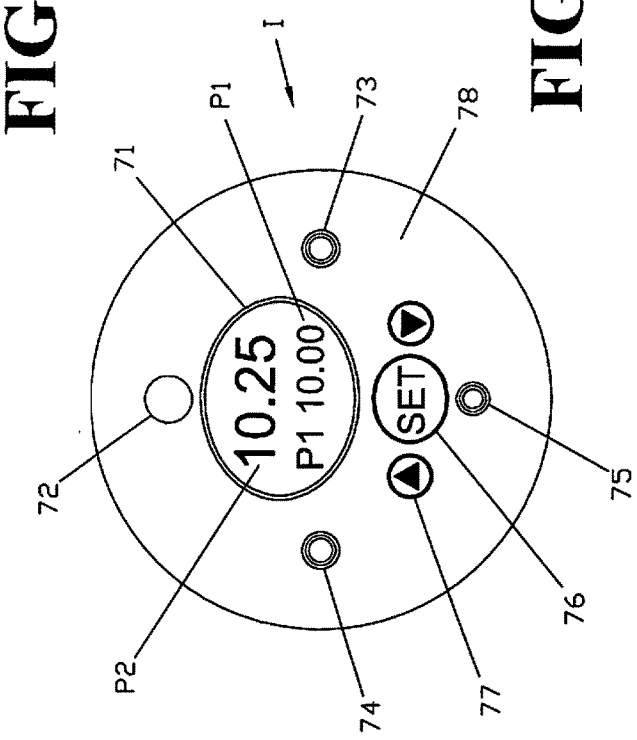
FIG. 3 is an end view of the pressure regulator of FIG. 1 illustrating the connectors, control switches and display thereof.

Looking at FIGS. 1-3, a preferred embodiment of the vehicle-tire pressure-level regulator includes an electrical power source 10, a pump 20 with motor 30, a control electronics module 40 and two solenoid valves 50 and 60. The control electronics module 40 includes a pressure sensor 41 and a comparator 42.

Figure 4:
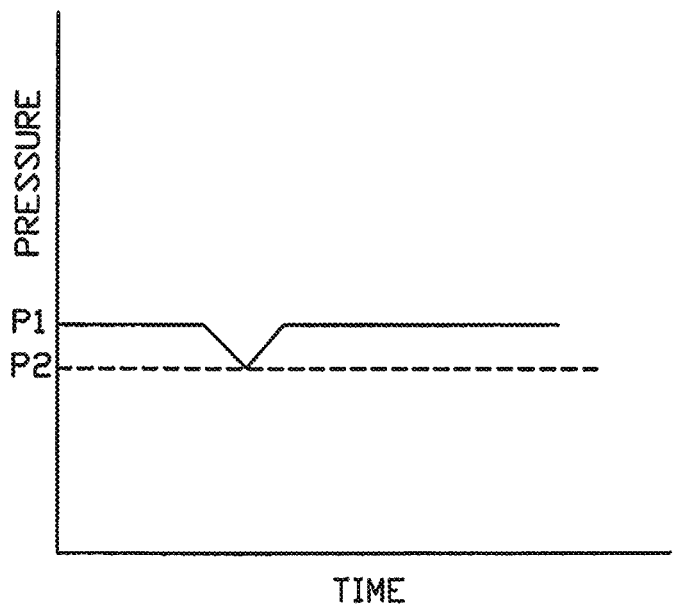
FIG. 4 is a graphic representation of signal comparisons for a single threshold signal comparator.
Figure 5:
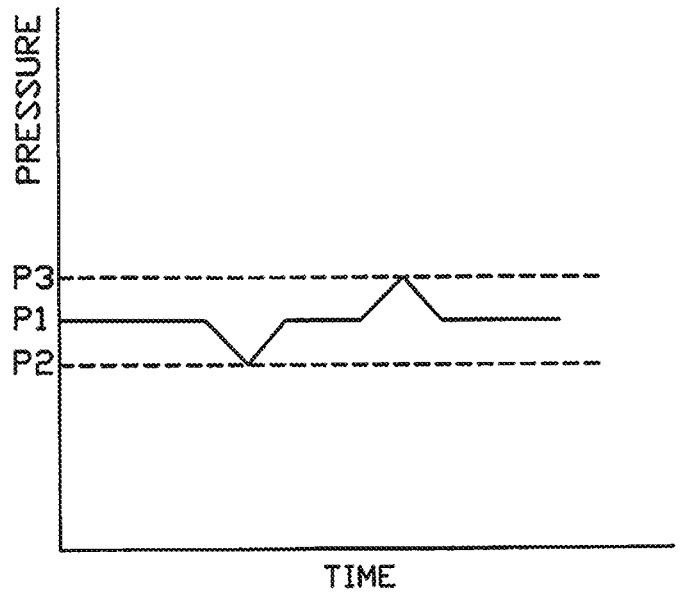
FIG. 5 is a graphic representation of signal comparisons for a high and low threshold signal comparator.

Turning to FIGS. 4 and 5, the pressure sensor 41 detects the real-time pressure of the vehicle tire T which is converted by the comparator 42 into a real-time pressure signal $P_1$. The comparator 42 generates a signal $P_2$ indicative of a predetermined threshold tire pressure and compares the threshold signal $P_2$ with the real-time tire pressure signal $P_1$.

Returning to FIG. 1, the comparator 42 outputs a "low pressure" control signal when the threshold signal $P_2$ exceeds the real-time tire pressure signal $P_1$ and a "high pressure" control signal when the real-time tire pressure signal $P_1$ exceeds the threshold signal $P_2$. A "low pressure" control signal causes the power source 10 to be connected 43 to motor 30 and one of the solenoid valves 50, causing inflation of the tire T to the predetermined threshold tire pressure level. A "high pressure" control signal causes the power source 10 to be connected 44 to the other solenoid valve 60, opening the vent to permit deflation of the tire T to the predetermined threshold tire pressure level.

Looking at FIG. 2, a housing H contains the electrical power source 10, the pump 20 with motor 30, the control electronics module 40 including include the pressure sensor 41 and a comparator 42, and the two solenoid valves 50 and 60, electrically and pneumatically connected as illustrated in FIG. 1. As shown, electrical power source 10, insists of four batteries such as "AA" cells connected in series for nominal 12 VDC supply.

The housing H is closed at the battery end by a cap C and at the valve end by an interface housing I best seen in FIG. 3. The user interface housing I provides external access to a display 71 indicating the predetermined threshold pressure $P_1$ and the real-time tire pressure $P_2$, an air intake/exhaust 72 for the pneumatic system, an air line 73 serving the pump system, an air line 74, serving the vent system, a passage 75 serving on/off capability for the electrical system, a set button 76 allowing the user to input values for the threshold pressure $P_1$ using up and down toggles 77 and 78. The housing H is preferably mounted in the end of a vehicle axle with the interface I accessible to the user.

Preferably, the comparator compares the real-time control signal with the predetermined threshold signal. The level of the predetermined threshold signal may be constant or variable in accordance with input by the user to the comparator. As seen in FIGS. 4 and 5, preferably representing psi and seconds, the threshold signal may include a first threshold signal $P_2$ representative of a predetermined "low pressure" level of the tire and a second threshold signal $P_3$ representative of a predetermined "high pressure" level of the tire. The first and second threshold signals may each be independent signals of respective predetermined constant or variable amplitude.

In operation, a comparator with a preset threshold pressure level pattern or a comparator with a programmable threshold pressure level pattern can be employed. For a programmable comparator, the user will first input the parameters of the predetermined threshold pressure level signal to the comparator. In either case, the comparator will generate a threshold signal representative of the threshold press rre level pattern. A sensor will detect the real-time pressure of the tire and the comparator will convert the detected pressure data into a control signal representative of a real-time pressure level of the tire. The comparator compares the real-time control signal with the threshold signal to derive a "low pressure" control signal when the threshold signal exceeds the real-time control signal. In response to the presence of a "low pressure" control signal, air is pumped from the air surrounding the tire into the tire. The comparator compares the real-time control signal with the threshold signal to derive a "high pressure" control signal when the real-time control signal exceeds the threshold signal. In response to the presence of a "high pressure" control signal, air is released from the tire into the air surrounding the tire.

The real-time control signal may be intermittent or continuous in duration. The threshold signal is of continuous duration and may be of constant or variable amplitude. The pump/motor may be a Parker P/N E129-13-120, the valves Asco P/N 411L311HV and the pressure controller a Dwyer P/N MDPC-112.

Figure 6:
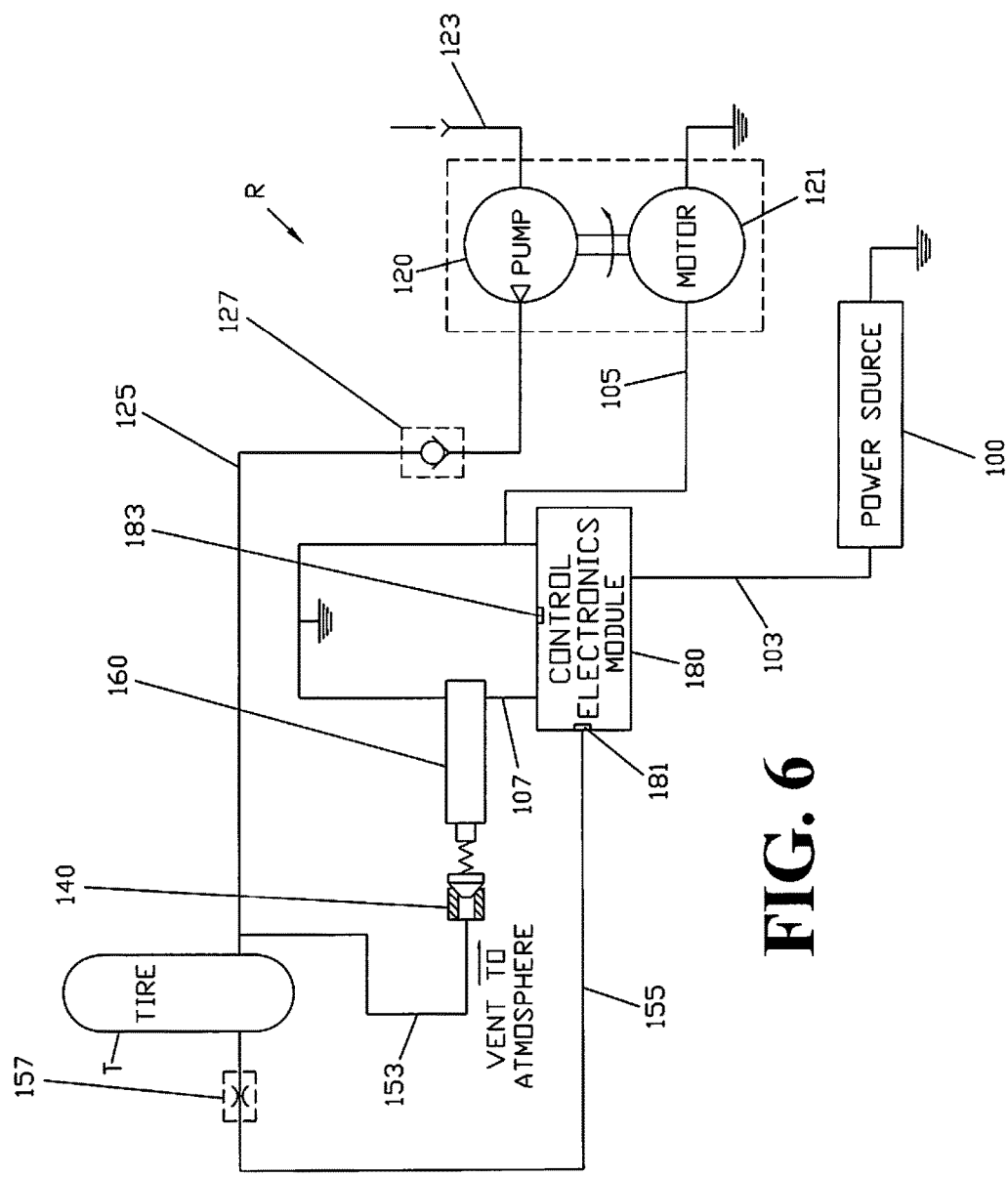
FIG. 6 is a schematic block diagram illustrating the configuration of pneumatic and electrical components of another embodiment of a vehicle-tire pressure-level regulator in accordance with the invention.

Turning now to FIGS. 6-8, another embodiment of pressure-level regulator R suitable for use with a tire T of a race-car is illustrated. As seen in FIG. 6, each tire T has its own regulator R so that, despite different demands made on different tires of the same vehicle at any moment during a race, each of the tires can independently closely track a predetermined acceptable pressure.

Looking at FIG. 7, each regulator R has a cylindrical housing H closed at its battery end by a cap C and at its valve end by an interface I. The housing H contains a power source 100, a pump 120, a pressure vent 140 with an actuator 160 and a control electronics module 180.

Continuing to look at FIG. 7, the power source 100 as shown consists of four batteries 101 connected to provide a nominal 12 VDC supply. The pump 120 is driven by an electric motor 121. The actuator 160 is a linear actuator and may be electrical, as shown, or pneumatic or hydraulic. The control electronics module 180 includes circuitry adapted to control the operation of the motor 121 to drive the pump 120, circuitry adapted to control the actuator 160 to vary the rate of flow through the pressure vent 140, a pressure sensor 181 for detecting the real-time pressure level of the tire T and an accelerometer 183 for detecting the status of vehicle-turning forces on the tire T, particularly whether forces which would distort the cross-section of the tire T are present.

Continuing to look at FIGS. 6 and 7, the housing H also contains the interconnections of the pneumatic and electrical components and the user interface I of the regulator R. The electrical power interconnections include the power lines 103, 105 and 107 from the power source 100 to the control electronics module 180 and from the control electronics module 180 to the pump motor 121 and to the actuator 160, respectively. The electrical control interconnections are all internal to the control electronics module 180. The pneumatic interconnections are discrete and include the atmospheric air intake 123 of the pump 120, a pressure build-up line 115 from the pump 120 to the tire T that includes a check valve 127 to eliminate the possibility of leakage from the pump 120, a pressure release line 153 from the tire T to the pressure vent 140 and a pressure sensing line 155 from the tire T to the pressure sensor 181 in the control electronics module 180. An optional orifice 157 is located in the pressure sensing line 155 to negate the possibility that transient positive spikes in the pressure level of the tire T could unnecessarily initiate a release of pressure from the tire T.

Figure 9:
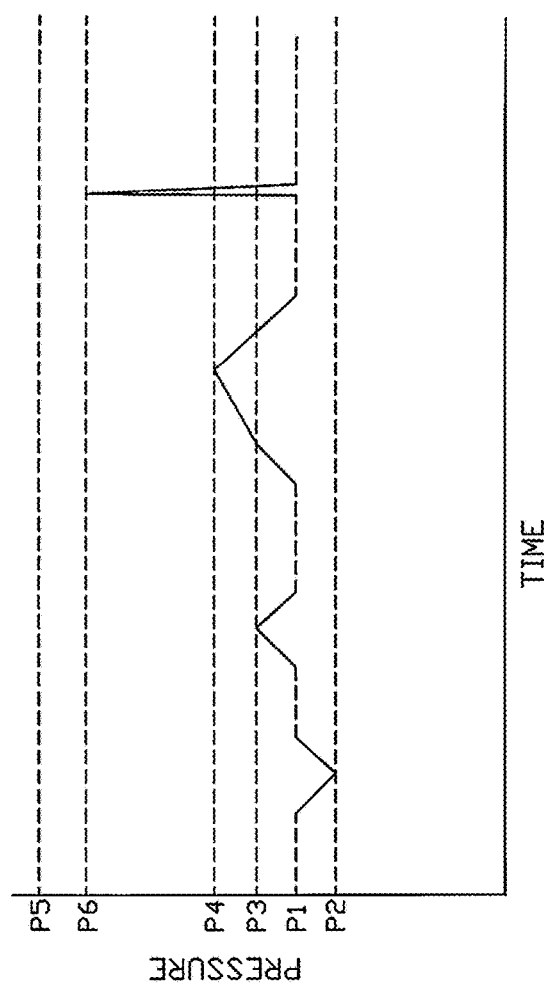
FIG. 9 is an exemplary pressure vs. time graphic representation of the operation of the vehicle-tire pressure-level regulator of FIG. 6.

Looking at FIGS. 7 and 9, the interface I provides external user access to an LED display 191 indicating the threshold operating pressure level $P_1$ desired to be maintained in the tire T, to the air intake/exhaust 192 from and to the atmosphere, to an air line 193 inletting and outletting air to and from the tire T, to an air line 194 serving the pressure sensor 181, to a button 195 serving on/off capability for the electrical system and to set button 196 allowing the user to input values for the threshold operating pressure $P_1$ using up and down toggles 197 and 198.

Looking at FIG. 6, in the operation of the regulator R, the circuitry of the control electronics module 180 maintains the motor 121 and the actuator 160 in normally disconnected states so that the pump 120 is normally deactivated and the pressure vent 140 is normally closed.

Returning to FIG. 9, low and high threshold pressure levels $P_2$ and $P_3$, respectively, and a higher threshold pressure level $P_4$, all indicated by dashed lines, are shown at levels respectively below and above the selected threshold operating pressure level $P_1$, also indicated as a dashed line. The regulator R may be preconfigured so that, whatever desired operating pressure level $P_1$ may be selected by the user for the tire T, the low and high threshold pressure levels $P_2$ and $P_3$ might, for example, be 0.1 psi lower and higher, respectively, than the desired operating pressure level $P_1$ of the tire T while the higher threshold pressure level $P_4$ might be 0.3 psi higher than the desired operating pressure level $P_1$ of the tire T. Thus, if the user sets a desired threshold operating pressure $P_1$ to be 8.0 psi, the preconfigured levels of $P_2$, $P_3$ and $P_4$ would automatically be set at 7.9 psi, 8.1 psi and 8.3 psi, respectively. However, these settings are exemplary and the regulator R may be permanently preconfigured for all pressure levels or may be variable by the user for any or all pressure levels.

Continuing to look at FIG. 9, assume that a user has selected the desired threshold operating pressure $P_1$ to be 8.0 psi and that the levels of $P_2$, $P_3$ and $P_4$ are preconfigured by the regulator R to automatically set at 7.9 psi, 8.1 psi and 8.3 psi, respectively. During the course of a race the real-time pressure level of a tire T, shown as a solid line, fluctuates above and below the threshold operating pressure $P_1$. If the real-time pressure of the tire T reaches the low threshold pressure $P_2$ of 7.9 psi, without other provision, the normally-deactivated pump 120 is activated and continues to run until the real-time pressure of the tire T is returned to the threshold operating pressure $P_1$ of 8.0 psi at which time the pump 120 is deactivated. When the real-time pressure of the tire T reaches the high threshold pressure $P_3$ of 8.1 psi, without other provision, the vent 140 is opened and is maintained open until the real-time pressure of the tire T is returned to the threshold operating pressure $P_1$ of 8.0 at which time the normally-closed vent 140 is returned to the normally-closed condition.

However, the regulator R does make other provision for times during which the vehicle is not on a straightaway portion of the track. When the race car is travelling on a curve, turning forces cause cross-sectional distortion of the tire T which in turn cause the real-time pressure level of the tire T to deviate, but only for the duration of the turn. By the end of the turn, the tire T would substantially return to its pre-turn pressure level without assistance from the regulator R. Therefore, when the accelerometer 183 detects the presence of turning forces that cause the distortion of the tire T, the circuitry of the control electronics module 180 over-rides the normal operation of the regulator R to maintain the pressure vent 140 in its normally-closed condition throughout the turn.

As seen in FIG. 9, the regulator R also makes other provision for situations in which the real-time pressure of a tire T might reach a higher threshold pressure $P_4$ than the high threshold pressure level $P_3$. While the normally-closed pressure vent 140 may be a single-position valve that provides one predetermined rate of outlet flow, the vent 140 could also be a two-position valve providing a first predetermined rate of outlet flow in the first valve position and a second predetermined rate of outlet flow greater than the first in the second valve position.

Figure 10:
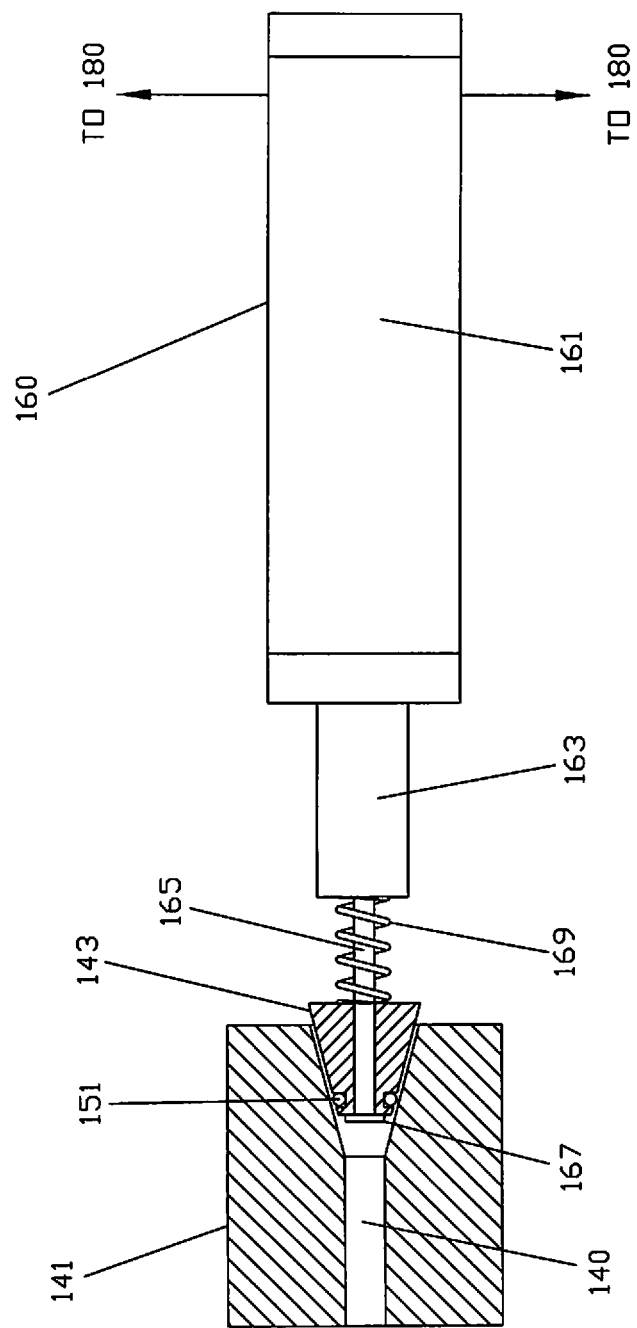
FIG. 10 is an enlarged block diagram of the valve and actuator of the vehicle-tire pressure-level regulator of FIG. 6.

Looking, for example, at FIG. 10, the valve 140 shown is a normally-closed two-position throttle valve with a tapered seat 141 and poppet 143. An O-ring 151 circling the poppet 143 facilitates a seal with the seat 141. The linear actuator 160 has a body 161 with a rain 163 adapted for axial reciprocation in relation to the body 161. A pin 165 extends axially from the ram 163 to the head 167 of the pin 165. The poppet 143 slides on the pin 165 into abutment with the head 167 of the pin 165. A coil spring 169 is compressed between the poppet 143 and the ram 163.

As seen in FIG. 9, the bias of the spring 169 is selected to assure that if, during operation of the regulator R, an absolute maximum pressure $P_5$ of the regulator R is exceeded, the spring 169 will be overcome and the vent 140 will crack open to release the pressure. However, returning to FIG. 10, in normal operation it is the actuator 160 that operates to reposition the poppet 143 in relation to the seat 141 while the spring 169 biases the poppet 143 against the head 167 of the pin 165. Unless the real-time pressure of the tire T overcomes the bias of the spring 169, the valve 140 remains in the normally closed condition until the real-time pressure of the tire T reaches the high threshold pressure level $P_3$ seen in FIG. 9.

Figure 11A:
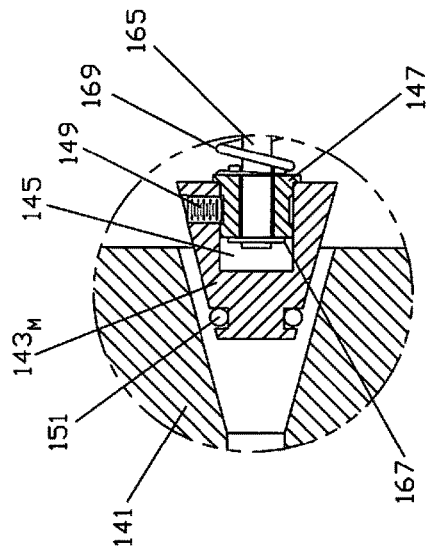
FIGS. 11A, 11B and 11C are partial enlarged diametric cross-sectional views of the valve and actuator of FIG. 10 with the valve sequentially in its fully-closed, first open and second open positions, respectively.
Figure 11B:
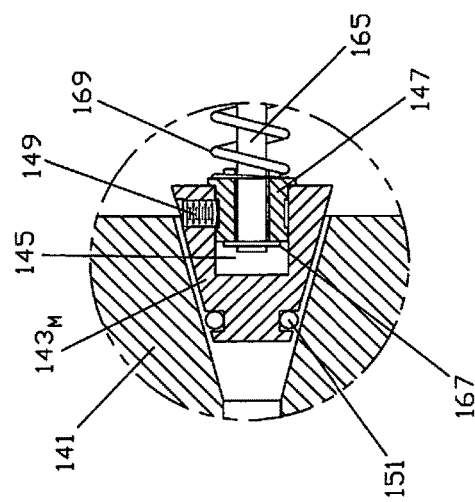
Figure 11C:
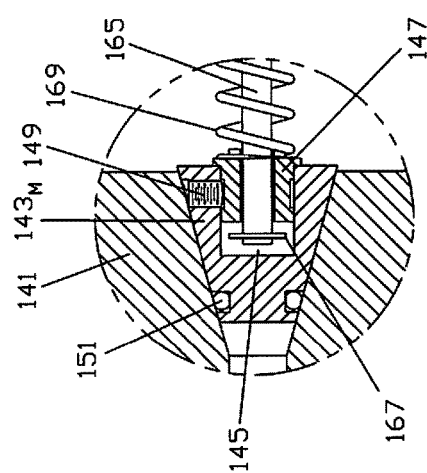

Turning to FIGS. 11A, 11B and 11C, a modified poppet $143_M$ has a cavity 145 partially filled by a sleeve 147 engaged in the poppet $143_M$, as shown by a set screw 149. The sleeve 147 guides the pin 165 to reciprocate the head 167 of the pin 165 in the unfilled portion of the cavity 145. Thus, as seen in FIG. 11A, the spring 169 of the actuator 160 may be preloaded to cause the head 167 of the pin 165 to extend a short distance beyond the poppet $143_M$ into the cavity 145, for example by a distance of approximately 0.050", to provide a selected stroke tolerance assuring full insertion of the wobbling poppet $143_M$ into the valve seat 141. As shown, the depth of the cavity 145 is sufficient to permit the rain 163 to drive the head 167 of the pin 165 into the cavity 145 within the range of the selected stroke tolerance. Also, because of the modification adding the cavity 145 and the sleeve 147 to the poppet 143, the inner diameter of the poppet $143_M$ may be sized sufficiently greater than the outer diameter of the pin 165 so that the poppet $143_M$ can wobble on the pin 165, assuring that the poppet $143_M$ will be fully seated in the seat 141.

Continuing to look at FIGS. 11A, 11B and 11C, the two-position embodiment of the valve 140 is seen in its normally-closed condition, its first open position and its second open position, respectively. The normally-closed condition of the two-position valve 140 seen in FIG. 11A is operationally the same as the normally-closed condition of the single position valve 140 seen in FIG. 10.

Looking at FIGS. 9 and 11A, when the real-time pressure level of the tire T is somewhere between the low $P_2$ and high $P_3$ threshold pressures, the position of the rain 163 of the actuator 160 and the bias of the spring 169 hold the poppet $143_M$ the valve seat 141 and the two-position valve 140 is closed.

Looking at FIGS. 9 and 11B, when the real-time pressure of the tire T reaches the high threshold pressure level $P_3$, if the accelerometer 183 does not indicate the presence of vehicle-turning forces, the circuitry of the electronic control module 180 is adapted to operate the actuator 160 to cause the poppet $143_M$ to withdraw to the first open position, allowing pressure to be released from the tire T at the first rate of outlet flow until the real-time pressure of the tire T returns to desired operating level $P_1$ or reaches the higher threshold pressure level $P_4$. When the real-time pressure of the tire T reaches the desired operating pressure $P_1$, the circuitry of the electronic control module 140 is adapted to operate the actuator 160 to return the poppet to $143_M$ the normally-closed condition of FIG. 11A.

Looking at FIGS. 9 and 11C, if the first rate of outlet flow is insufficient to release the pressure rapidly enough, when the real-time pressure level of the tire T builds to the higher threshold pressure level $P_4$, and if the accelerometer 183 still does not indicate the presence of vehicle-turning forces, the circuitry of the control electronics module 180 is adapted to operate the actuator 160 to cause the poppet $143_M$ to further withdraw to the second open position, allowing pressure to be released from the tire T at the higher second rate of outlet flow. When the real-time pressure level of the tire T returns to the high threshold level $P_3$, the circuitry of the control electronics module 180 is adapted to operate the actuator 160 to cause the poppet $143_M$ to return to the first open position shown in FIG. 11B, from which further operation may be controlled to return the poppet $143_M$ to the fully closed condition of FIG. 11A or the second open position of FIG. 11C, depending on whether the real-time pressure level of the tire T decreases or increases, respectively.

Still looking at FIG. 9, the regulator R also makes other provision to account for true positive pressure spikes $P_6$, a true pressure spike being a spike above the highest threshold pressure level of the tire T, pressure level $P_3$ for a single-position valve 140 or pressure level $P_4$ for a two-position valve 140, and continuing for less than a predetermined duration. This can be accomplished mechanically, for example by a mechanism such as the optional orifice 157 seen in FIGS. 6 and 7, or electrically, for example by adapting the control electronics module 180 to detect the spike $P_6$.

The cross-section of the orifice 157 can be sized and shaped to permit a true spike to dissipate within the predetermined duration, avoiding detection by the pressure sensor 181. If the pressure increase is not a true spike, the predetermined time will be exceeded and detection by the sensor 181 will result in the normal operation of the regulator R. This can also be accomplished by adapting the control electronics module 180 to cause the normally-closed pressure vent 140 to remain in its closed condition upon the occurrence of a pressure increase above the highest threshold pressure level $P_3$ or $P_4$ of the tire T for less than the predetermined duration.

For high pressure control, the throttle valve 140 and the actuator 160 are cooperatively configured to vary the rate of pressure release from the tire T to the atmosphere. The circuitry of the control electronics module 140 is adapted to control the operation of the actuator 160. For example, for a single position valve 140, the control electronics module 180 can be adapted to receive a first signal representative of the detected real-time pressure level of the tire T, a second signal representative of the high threshold pressure level $P_3$ of the tire T and a third signal representative of the status of vehicle-turning forces on the tire T. The control electronic module 180 produces control signals selecting positions of the actuator 160 in response to the received signals. For a two-position valve 140, the control electronics module 180 also receives a fourth signal representative of the higher threshold pressure level $P_4$ of the tire T and in response further produces control signals to the actuator 160. The circuitry of the control electronics module 180 could, for example, include comparators producing control signals causing the actuator 160 to operate the pressure vent 140 in response to the received signals. As explained herein, variation is stepped according to preset positions of the actuator 160 and, therefore, of the valve 140. However, variation could be accomplished by gradual valve control.

For low pressure control, the circuitry of the control electro module 180 is adapted to control the operation of the motor 121 and, therefore, of the pump 120. For example, the control electronics module 180 can be adapted to receive a first signal representative of the detected real-time pressure level of the tire T and a second signal representative of the low threshold pressure level $P_2$ of the tire T. The circuitry of the control electronic module 180 could, for example, include comparators producing control signals causing the motor 121 to operate the pump 120 in response to the received signals.

The control electronics module 180 can also be adapted, or other mechanisms such as the orifice 157 provided, to account for the occurrence of pressure spikes.

Looking at FIGS. 9 and 11A, 11B and 11C, according to the method of regulating the pressure-level of the vehicle tire T, the status of vehicle-turning forces on the tire T is determined and the normally-closed pressure vent 140 of the tire T is maintained in its closed condition during detection that vehicle-turning forces are present on the tire T. The real-time pressure level of the tire T is detected. A high threshold pressure level $P_3$ of the tire T is selected. During a simultaneous occurrence of both a detected real-time pressure level of the tire T being higher than the selected high threshold pressure level $P_3$ of the tire T and a lack of a detection that vehicle-turning forces are present on the tire T, the normally-closed pressure vent 140 of the tire T is opened to provide a predetermined rate of outlet flow.

For applications using a two-position valve 140, a higher threshold pressure level $P_4$ of the tire T than the high threshold pressure level $P_3$ of the tire T is also selected. During a simultaneous occurrence of both a detected real-time pressure level of the tire T being higher than the selected higher threshold pressure level $P_4$ of the tire T and a lack of a detection that vehicle-turning forces are present on the tire T, the normally-closed pressure vent 140 is opened further to provide a higher predetermined rate of outlet flow than the predetermined rate of outlet flow.

Also according to the method of regulating the pressure-level of the vehicle tire T, the status of vehicle-turning forces on the tire T is determined and the normally-deactivated pump 120 is maintained in the deactivated condition when vehicle-turning forces are present on the tire T.

The real-time pressure level of the tire T is detected. A low threshold pressure level $P_2$ of the tire T is selected. During an occurrence of the detected real-time pressure level of the tire T being less than the selected low threshold pressure level $P_2$ of the tire T, the normally-deactivated pump 120 is activated.

Optionally, having detected the real-time pressure level and selected a high or higher threshold pressure level $P_3$ or $P_4$ of the tire T, during the occurrence of a positive pressure spike at a level greater than the selected high threshold pressure level $P_3$ or $P_4$ for less than a predetermined duration of time, the normally-closed pressure vent 140 of the tire T is maintained in a closed condition.

The ram of the actuator 180 may be a sliding mechanism with a spring-biased poppet attached to one end and a hole with an Acme thread at the other end. If so, the drive of the actuator 180 may be a stepper motor with a mating Acme screw segment attached to its output shaft to reciprocate the sliding mechanism, providing linear position selection capability. An Actuonics L12-30-210-12-I linear actuator, a Lin Engineering 208-17-RO stepper motor, a Parker Hannifin E129-13-120 pump, a Lumex LDQ-M284RI LED display, Rafi 1.14.002.101/0000 "up" "down", "on/of", and "set" switches, LiPo type batteries of about 1300 mAh capacity and 11.1 volts and a Honeywell Sensing and Productivity Solutions ABPDANT015PGAA5 pressure sensor can be combined with a custom electronics control module as herein described to provide a functional regulator R in accordance with the invention.

Thus, it is apparent that there has been provided, in accordance with the invention, a tire pressure regulator that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A regulator for controlling a pressure-level of a vehicle-tire, the regulator comprising:

an accelerometer detecting a status of vehicle-turning forces on the tire;
a normally-closed pressure vent disposed in a discrete pneumatic path between the tire and atmospheric air;
a sensor detecting a real-time pressure level of the tire;
a signal representative of a high threshold pressure level of the tire;
a controller adapted to cause said normally-closed pressure vent:
  to remain closed during a detected said presence of vehicle-turning forces on the tire; and
  to be open during a simultaneous occurrence of both a detected said real-time pressure level of the tire being higher than said high threshold pressure level of the tire and a lack of a detected said presence of vehicle-turning forces on the tire;
said normally-closed pressure vent comprising a two-position valve, a first of said two positions providing a first predetermined rate of outlet flow and a second of said two positions providing a second predetermined rate of outlet flow greater than said first predetermined rate of flow;
the regulator further comprising another signal representative of a higher threshold pressure level of the tire than said high threshold pressure level of the tire; and
said controller being further adapted to cause said normally-closed pressure vent to be open in said second position during a simultaneous occurrence of both a detected said real-time pressure level of the tire being higher than said higher threshold pressure level of the tire and said lack of a detected said presence of vehicle-turning forces on the tire.

2. The regulator according to claim 1, said two-position valve comprising:
a normally-closed throttle valve having a tapered seat and poppet; and
a linear actuator having a compression spring biasing said poppet to full extension from said actuator and operable to switch said valve to said first of said two positions at said high threshold pressure level and to said second of said two positions at said higher threshold pressure level.

3. The regulator according to claim 2, said spring being preloaded and said poppet being configured to provide a selected stroke tolerance facilitating full insertion of said poppet in said seat.

4. The regulator according to claim 3, said poppet having a cavity and said linear actuator further comprising:
a body;
a rain adapted for axial reciprocation in relation to said body;
a pin extending axially from said rain to a head thereof; and
a sleeve engaged on said poppet and guiding said pin to reciprocate said pin head in said poppet cavity;
said coil spring being compressed between said sleeve and said rain and a depth of said cavity being sufficient to permit said rain to drive said pin head therein within a range of said selected stroke tolerance.

5. The regulator according to claim 1, said pressure vent comprising a throttle valve and an actuator operating said valve to control a rate of pressure release from the tire to the atmosphere.

6. The regulator according to claim 5, said controller receiving a first signal representative of a detected said real-time pressure level of the tire, a second signal representative of said threshold high pressure level of the tire and a third signal representative of a said lack of presence of vehicle-turning forces on the tire and producing control signals selecting positions of said actuator in response thereto.

7. A regulator for controlling a pressure-level of a vehicle-tire, the regulator comprising:
   a normally-closed throttle valve having a seat and a poppet disposed in a discrete pneumatic path between the tire and atmospheric air; and
   a linear actuator having a compression spring biasing said poppet to full extension from said actuator, said spring being preloaded to provide a selected tolerance facilitating full insertion of said poppet in said seat as said poppet is driven from an open to a closed condition of said valve.

8. The regulator according to claim 7, said poppet having a cavity and said linear actuator comprising:
   a body;
   a ram adapted for axial reciprocation in relation to said body;
   a pin extending axially from said rain to a head thereof; and
   a sleeve having an inside diameter sized to permit said sleeve to wobble axially on an outer diameter of said pin, said sleeve being secured in said cavity and guiding said pin to reciprocate said pin head in said cavity;
   said coil spring being compressed between said sleeve and said rain;
   a depth of said cavity being sufficient to permit said rain to drive said pin head therein within a range of said selected tolerance.

9. A regulator for controlling a pressure-level of a vehicle-tire, the regulator comprising:
   a normally-closed pressure vent disposed in a discrete pneumatic path between the tire and atmospheric air;
   an accelerometer detecting a presence of vehicle-turning forces on the tire;
   a sensor detecting a real-time pressure level of the tire; and
   a signal representative of a high threshold pressure level of the tire; and
   a controller adapted to cause said normally-closed pressure vent:
      to remain closed during a detected said presence of vehicle-turning forces on the tire; and
      to be open during a simultaneous occurrence of both a detected said real-time pressure level of the tire being higher than said high threshold pressure level of the tire and a lack of a detected said presence of vehicle-turning forces on the tire; and
   a mechanism adapted to cause said normally-closed pressure vent to remain closed upon the occurrence of a positive pressure spike above said high threshold pressure level of the tire for less than a predetermined duration.

10. The regulator according to claim 9, said mechanism comprising one of (a) an orifice disposed in a pneumatically discrete flow path between the tire and said sensor and (b) said controller being further adapted to ignore pressure changes existing for less than said predetermined duration.

11. A method of regulating the pressure-level of a vehicle tire comprising the steps of:
    detecting a status of vehicle-turning forces on the tire;
    maintaining a normally-closed pressure vent of the tire in its closed condition during a detected presence of vehicle-turning forces on the tire;
    detecting a real-time pressure level of the tire;
    selecting a high threshold pressure level of the tire; and
    opening the normally-closed pressure vent of the tire to provide a predetermined rate of outlet flow during a simultaneous occurrence of both a detected real-time pressure level of the tire being higher than the selected high threshold pressure level of the tire and a lack of a detected presence of vehicle-turning forces on the tire;
    selecting a higher threshold pressure level of the tire than the high threshold pressure level of the tire; and
    opening the normally-closed pressure vent of the tire to provide a higher predetermined rate of outlet flow than the predetermined rate of outlet flow during a simultaneous occurrence of both a detected real-time pressure level of the tire being higher than the selected higher threshold pressure level of the tire and a lack of a detected presence of vehicle-turning forces on the tire.

12. A method of regulating the pressure-level of a vehicle tire comprising the steps of:
    detecting a real-time pressure level of the tire;
    selecting a high threshold pressure level of the tire; and
    maintaining a normally-closed pressure vent of the tire in a closed condition during the occurrence of a positive pressure spike having a level greater than the selected high threshold pressure level of the tire for less than a predetermined duration of time.

13. The method according to claim 12 further comprising the steps of:
    detecting a status of vehicle-turning forces on the tire;
    maintaining a normally-closed pressure vent of the tire in its closed condition during a detected presence of vehicle-turning forces on the tire; and
    opening the normally-closed pressure vent of the tire during a simultaneous occurrence of both the detected real-time pressure level of the tire being higher than the selected high threshold pressure level of the tire and the lack of a detected presence of vehicle-turning forces on the tire.

* * * * *